US011113137B2

(12) United States Patent
Gaida

(10) Patent No.: US 11,113,137 B2
(45) Date of Patent: Sep. 7, 2021

(54) ERROR INCIDENT FINGERPRINTING WITH UNIQUE STATIC IDENTIFIERS

(71) Applicant: SAP SE, Walldorf (DE)

(72) Inventor: Robert Gaida, Heidelberg (DE)

(73) Assignee: SAP SE, Walldorf (DE)

( * ) Notice: Subject to any disclaimer, the term of this patent is extended or adjusted under 35 U.S.C. 154(b) by 381 days.

(21) Appl. No.: 16/114,873

(22) Filed: Aug. 28, 2018

(65) Prior Publication Data

US 2020/0073738 A1 Mar. 5, 2020

(51) Int. Cl.
*G06F 11/07* (2006.01)
*H04L 12/24* (2006.01)
*G06N 5/02* (2006.01)
*G06F 11/34* (2006.01)
*G06N 20/00* (2019.01)

(52) U.S. Cl.
CPC ........ *G06F 11/079* (2013.01); *G06F 11/0766* (2013.01); *G06F 11/0793* (2013.01); *G06F 11/3476* (2013.01); *G06N 5/022* (2013.01); *G06N 20/00* (2019.01); *H04L 41/5074* (2013.01); *G06F 2201/81* (2013.01)

(58) Field of Classification Search
CPC ............... G06F 11/079; G06F 11/0793; G06F 11/0775; G06F 11/3644; G06F 2201/865; G06F 11/0766; G06F 11/3476; G06F 2201/81; G06N 5/022; H04L 41/5074
See application file for complete search history.

(56) References Cited

U.S. PATENT DOCUMENTS

| 2005/0091647 | A1* | 4/2005 | McCollum ................ G06F 8/20 717/130 |
| 2011/0055480 | A1* | 3/2011 | Guyetant .............. G06F 12/084 711/118 |
| 2016/0371169 | A1* | 12/2016 | Guo .................... G06F 11/3664 |
| 2018/0217865 | A1* | 8/2018 | Caliendo, Jr. ......... G06F 9/4843 |
| 2019/0065198 | A1* | 2/2019 | Kinzinger ........... G06F 9/30134 |
| 2019/0116178 | A1  | 4/2019 | Coffey et al. |

OTHER PUBLICATIONS

"System Error Codes," msdn.microsoft.com, visited May 30, 2018, 1 page.
"System Error Codes (0-499)," msdn.microsoft.com, visited May 30, 2018, 29 pages.
"System Error Codes (500-999)," msdn.microsoft.com, visited May 30, 2018, 35 pages.

(Continued)

*Primary Examiner* — Jigar P Patel
(74) *Attorney, Agent, or Firm* — Klarquist Sparkman, LLP

(57) ABSTRACT

A wide variety of software support functionality can be improved via error incident fingerprinting with unique static identifiers. Such unique identifiers can originate within an integrated development environment and be propagated to runtime, where they can be harvested from execution context at the time of an error. The fingerprint created from such a unique identifier can then be used for a variety of purposes, including indexing knowledge base records, criticality detection, service innovation, alerting, incident resolution, impacts to the development process, and machine learning.

20 Claims, 17 Drawing Sheets

(56) References Cited

OTHER PUBLICATIONS

Correa, Incident Management and Change Request Management: E-Mail functionality in SAP Solution Manager 7.1, SAP Blogs, Jan. 20, 2013, 149 pages.
Tutorialspoint, "SAP Solman—Incident Management," www.tutorialspoint.com, visited Jun. 25, 2018, 9 pages.
"Incident management (ITSM)," Wikipedia, en.wikipedia.org, visited Jun. 25, 2018, 8 pages.
Former Member, "Number Ranges—Things to Keep in Mind," blogs.sap.com, May 29, 2015, 29 pages.
"SAP Web IDE: Official SAP Web IDE tutorials and resources," www.sap.com/developer, 12 pages, visited Jun. 25, 2018.
"SAP Web IDE Full-Stack," SAP SE, help.sap.com, Jun. 10, 2018, 470 pages.
"Universally unique identifier," Wikipedia, en.wikipedia.org, visited Jun. 26, 2018, 11 pages.
Tarun, "Test Automation for Different Locale?" Stack Exchange, stackexchange.com, Aug. 7, 2011, 4 pages.

* cited by examiner

ERROR INCIDENT FINGERPRINTING WITH UNIQUE STATIC IDENTIFIERS

FIELD

The present disclosure generally relates to error incident fingerprinting for software applications.

BACKGROUND

Solving software errors is notoriously difficult. In some cases, an innocent minor condition can cause a seemingly unrelated major error. Because software users are often unskilled in solving errors that they encounter, they relay their software error problems to a support specialist. A typical support specialist needs a few months of experience to become proficient at processing even basic error requests, and an expert typically needs a few years in the field before becoming proficient at a deeper level.

A variety of techniques have been used to address the issues surrounding software errors. A core activity is documenting and reporting software error incidents. For example, a database can store trouble tickets submitted by users to track progress in solving the errors. Such trouble ticket software can be helpful to manage the workflow and communication issues that arise as part of encountering errors in software.

However, the software user who is reporting the error typically does not have enough experience to actually provide much helpful information about the error. As a result, the trouble ticket database can be filled with descriptions of different errors that have little value in actually solving the underlying problems. The staff of support specialists tasked with serving as a human interface between a struggling user and the underlying software system typically lacks the experience to provide much help and often refer difficult errors to upper level software support personnel with more knowledge and experience. However, the low experience levels of the support staff can exacerbate the problem for the experts because they add another element of uncertainty and inaccuracy.

There thus remains a need to improve error incident processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method comprises, upon encountering an error during runtime of an application, collecting an error context of the error, wherein the error context comprises a unique static identifier generated at development time of the application, and the unique static identifier identifies an application component definition of an application component in which the error occurred; based at least on the unique static identifier, generating an error incident fingerprint of the error; generating an error incident record comprising the error incident fingerprint of the error; finding a match between the generated error incident record and one or more other error incident records based on the error incident fingerprint generated from the unique static identifier; and storing an association between the generated error incident record and the one or more matching other error incident records.

In another embodiment, a system comprises one or more processors; memory coupled to the one or more processors comprising instructions causing the one or more processors to perform the following when executed: upon encountering an error during runtime of an application, collecting contextual information of the error, wherein the error contextual information comprises a unique static identifier generated at development time of the application, and the unique static identifier identifies a component location in which the error occurred; based at least on the unique static identifier, generating a fingerprint of the error; generating an error incident record comprising the fingerprint of the error; and generating an alert based on the error incident record.

In another embodiment, one or more computer-readable media have encoded thereon computer-executable instructions causing one or more processors to perform a method comprising, at development time of an application comprising a plurality of executable processes that comprise a collection of a plurality of executable tasks, generating a unique identifier of a given executable process out of the executable processes and generating a unique identifier of a given executable task out of the executable tasks, wherein the given executable task is a member of the collection of the given executable process; upon encountering an error during runtime of the application while executing the given executable task of the given executable process, retrieving the unique identifier of the given executable task and the unique identifier of the given executable process from an execution context of the application; combining the unique identifier of the given executable task and the unique identifier of the given executable process into a fingerprint of the error; based on the fingerprint of the error, locating a document in a knowledge base that describes a solution of the error; and outputting the document in the knowledge base that describes the solution of the error.

The foregoing and other objects, features, and advantages of the invention will become more apparent from the following detailed description, which proceeds with reference to the accompanying figures.

DETAILED DESCRIPTION

Example 1

Overview

In a typical software situation, an error incident report can be created with assistance from a user who encountered the error. In practice, however, the user is left with attempting to describe and provide context for a situation that may not be fully understood. The result can be a chaotic and inaccurate description of the error and its circumstances. Thus, it is almost impossible to use conventional error incident reports for automated processing in a support, alerting, development, or machine learning scenario.

The problem is exacerbated by the typical low experience level of the support staff who initially process the error incident report. Such a human layer in the system adds little to actually solving the error.

A unique-static-identifier-derived fingerprint can be used for error incident processing. A static identifier can originate during development time from an integrated development environment used to develop an application. The static identifier can then be incorporated into runtime-accessible information so that upon an error during execution of an application, the static identifier can be harvested for processing. A unique fingerprint identifying the error can then be generated from the static identifier and incorporated into an error incident record.

A wide variety of functionality can then be improved by using the fingerprint. For example, knowledge base processing (e.g., as part of support for the application) can use the fingerprint as a keyword, index, or tag for searching, correlation, and the like. Other functionality, such as criticality detection, service innovation, alerting, incident resolution, impacts to the development process, and machine learning can also be aided by use of the fingerprint.

Programming errors or other application error conditions can be more easily detected, recognized, and resolved, leading to better operation and utilization of computing resources. Alerting can better recognize and communicate error conditions.

The initial human layer of error incident reporting can thus be supplemented or replaced by an automated layer that can more easily identify, correlate, provide alerts about, learn from, and predict error conditions.

Also, software problems can be bundled much more quickly. Without error incident fingerprinting, different instances of the same error may not be recognized as actually being the same and instead be documented in separate documents. The error incident fingerprint can be re-used across support documents, facilitating matching between documents and avoiding duplicate documents. Consolidation and reduction in documentation can thus take place, and the number of support query search results can be reduced.

Example 2

Figure 1:
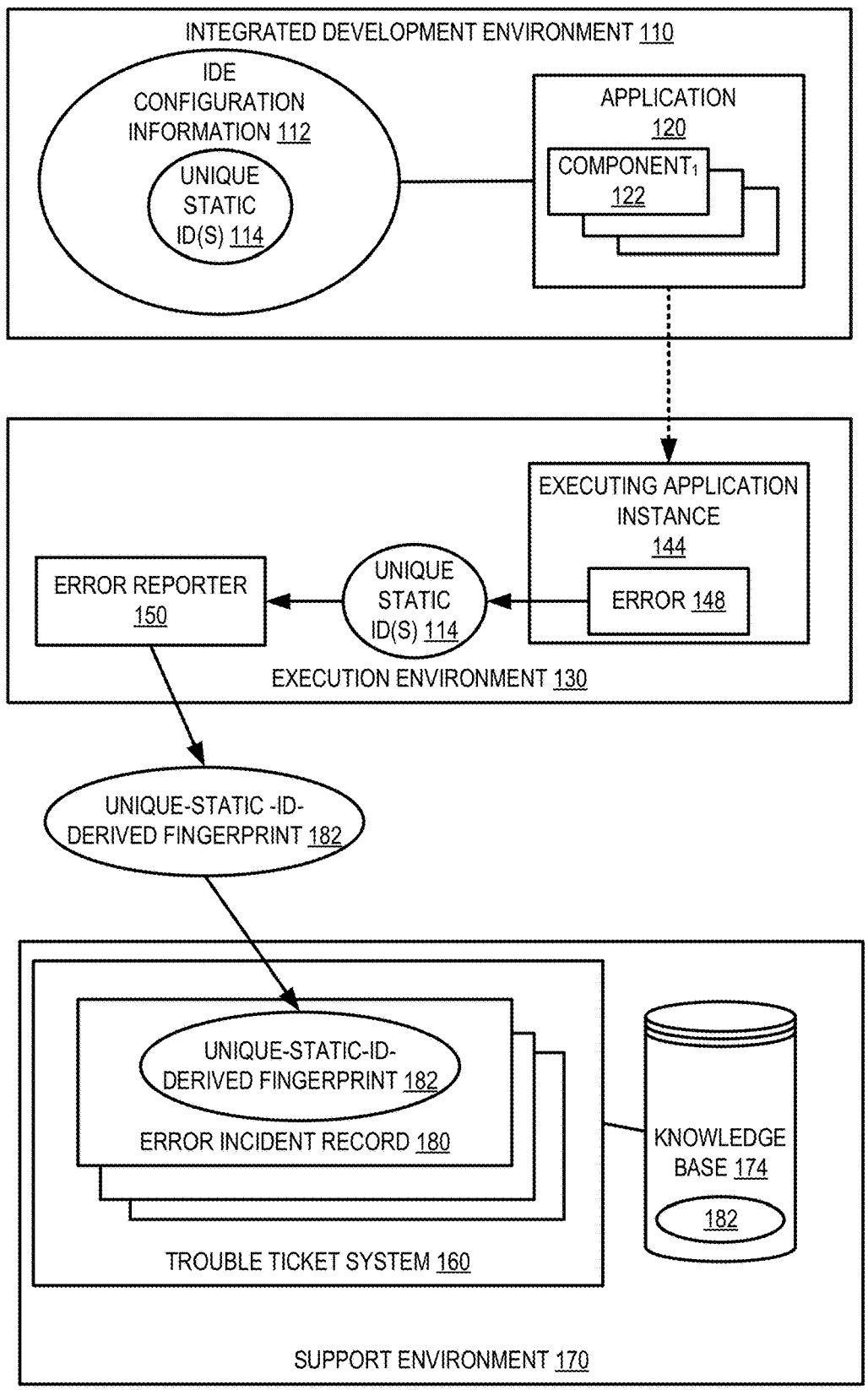
FIG. 1 is a block diagram of an example system implementing error incident fingerprinting with unique static identifiers.

Example Overall System Implementing Error Incident Fingerprinting With Unique Static Identifiers FIG. 1 is a block diagram of an example overall system 100 implementing error incident fingerprinting with unique static identifiers. In the example, the system 100 can include an integrated development environment ("IDE") 110 that comprises IDE configuration information 112 for the application 120. During development of the application 120, developers can rely on the configuration information 112 to aid the development process. For example, when entering function or parameter names, entry can be constrained to those values that are already defined (e.g., the input is validated).

As described herein, the IDE configuration information 112 can comprise unique static identifiers 114 that identify components 122 of an application 120 under development.

After the application is developed (e.g., at the end of a development cycle, after generating or regenerating the unique static identifiers 114, or the like), the application enters production or testing and is executed (e.g., at runtime).

An executing application instance 144 executes in an execution environment 130 and encounters an error 148. Upon encountering the error 148, execution can be handed off to error processing routine (e.g., an exception handler, software interrupt routine, or the like). The error processing routine can retrieve the unique static identifier 114, which originated within the integrated development environment 110 at development time, and pass it to an error reporter 150. As described herein, the error reporter 150 can receive the unique static identifier 114 as input and generate a unique-static-id-derived fingerprint 182.

The fingerprint 182 can be used in a variety of ways as described herein. In the illustrated example, an error incident record 180 can be generated by a trouble ticket system 160 as part of a support environment 170 and incorporate the fingerprint 182. Thus, data (e.g., the fingerprint 182) for the incident record 180 ultimately comes from (e.g., originates) from the IDE configuration information 112 (e.g., the identifier 114).

Similarly, a knowledge base 174 can use the fingerprint 182 as an index, tag, or keyword for items in the knowledge base 174 as described herein.

In any of the examples herein, although some of the subsystems are shown in a single box, in practice, they can be implemented as computing systems having more than one device. Boundaries between the components can be varied. For example, although the application 120 is shown as part of the integrated development environment 110, in practice, the integrated development environment 110 can be used to develop a variety of applications, and the applications can be considered separate from and run independently of the integrated development environment 110 (e.g., the integrated development environment 110 need not be executing for the application 120 to execute). In practice, any of the shown entities can be implemented under a plurality of scenarios (e.g., on premises, in the cloud, or a hybrid thereof).

In practice, the systems shown herein, such as system 100, can vary in complexity, with additional functionality, more complex components, and the like. For example, there can be additional functionality within the integrated development environment 110. Additional components can be included to implement security, redundancy, load balancing, report design, and the like.

The described computing systems can be networked via wired or wireless network connections. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the identifiers, fingerprints, components, component definitions, records, and the like can be stored in one or more computer-readable storage media or computer-readable storage devices. The technologies described herein can be generic to the specifics of operating systems or hardware and can be applied in any variety of environments to take advantage of the described features.

Example 3

Figure 2:
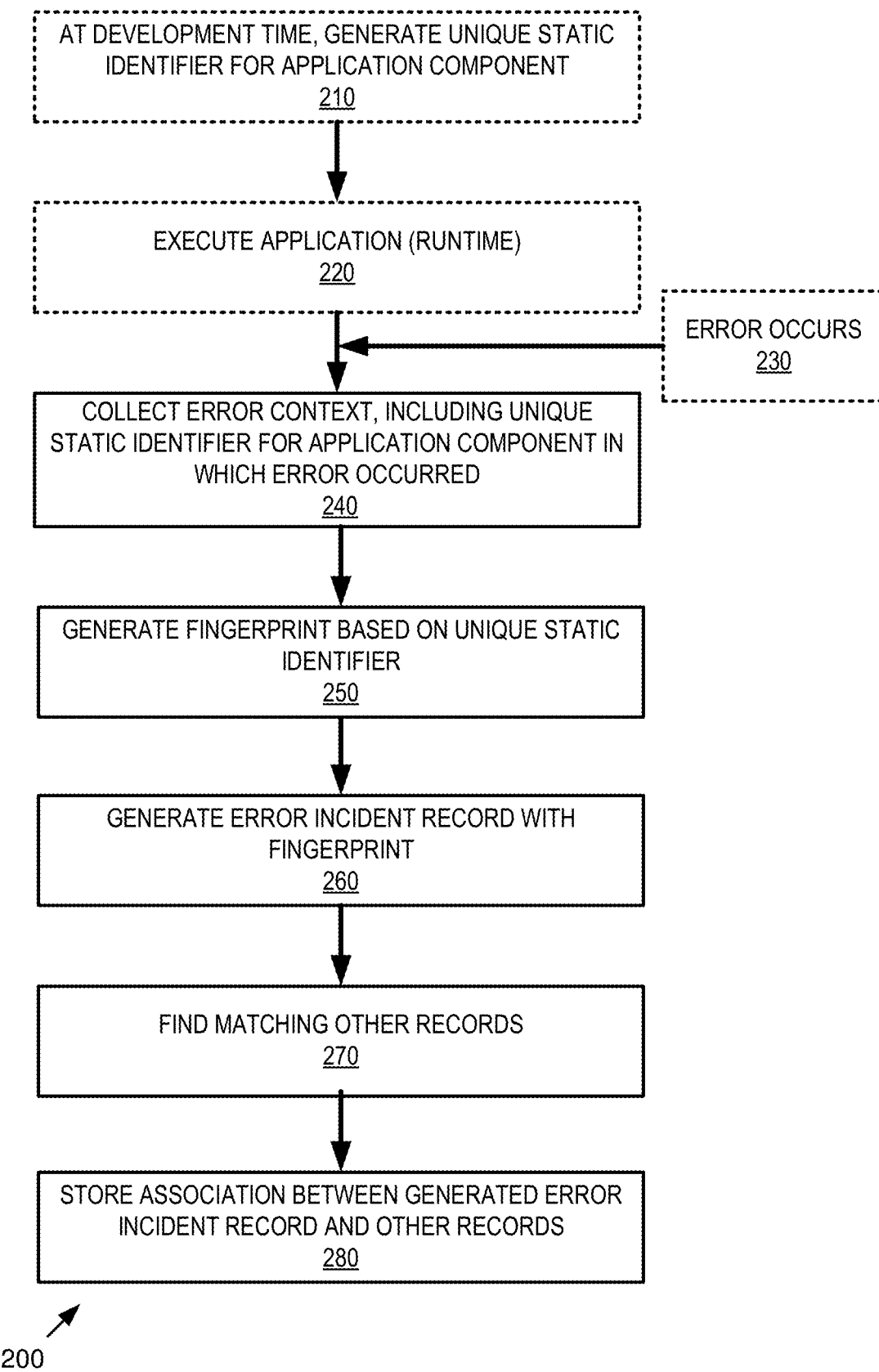
FIG. 2 is a flowchart of an example method of error incident fingerprinting with unique static identifiers.

Example Overall Method Implementing Error Incident Fingerprinting With Unique Static Identifiers FIG. 2 is a flowchart of an example overall method 200 of implementing error incident fingerprinting with unique static identifiers and can be performed, for example, by the system of FIG. 1.

In the example, at 210 a unique static identifier for an application is generated at development time. For example, as described herein, such an identifier can be generated in response to a request within the integrated development environment to generate a new application component. At some point, the application is then deployed for execution (e.g., for testing, production, or the like).

At 220, the application is executed at runtime.

At 230, during runtime, an error is encountered.

At 240, context about the error is collected. As described herein, such context can comprise a unique static identifier for an application component definition of an application component in which the error occurred (e.g., the location or range of locations of a software instruction that caused the error).

At 250, an error incident fingerprint can be generated based on the unique static identifier. The error incident fingerprint can be additionally based on other unique static identifiers or other information. The error incident fingerprint is thus derived from the unique static identifier as described herein. A variety of functionality can incorporate the fingerprint as described herein. The example shows generation of an error incident record.

At 260, an error incident record is generated with the error incident fingerprint. For example, the record can comprise the fingerprint.

At 270, a match between the generated error incident record and one or more other incident records (e.g., also having the fingerprint) can be found. Such a match can be found based on the fingerprint that was generated from the unique static identifier that originated at development time (e.g., from the integrated development information).

At 280, an association between the generated error incident record and the one or more matching other error incident records can be stored. Such an association can take the form of storing two error incident records with the same fingerprint, adding them to a list, mapping the same fingerprint to the error incident records, and the like. A variety of processing can then be performed as described herein. For example, subsequent searching for the fingerprint will reveal the fingerprint, alerts can be generated, criticality can be assessed, and the like. In some cases (e.g., the first time an error is encountered), such an association need not be stored.

In other scenarios, a knowledge base document can be located via the fingerprint. Such a knowledge base document can describe a solution to the error. The knowledge base document can be sent to a user identifier stored as associated with the error incident record.

In other scenarios, an alert can be generated based on the fingerprint.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Example 4

Example Use Cases

Figure 3:
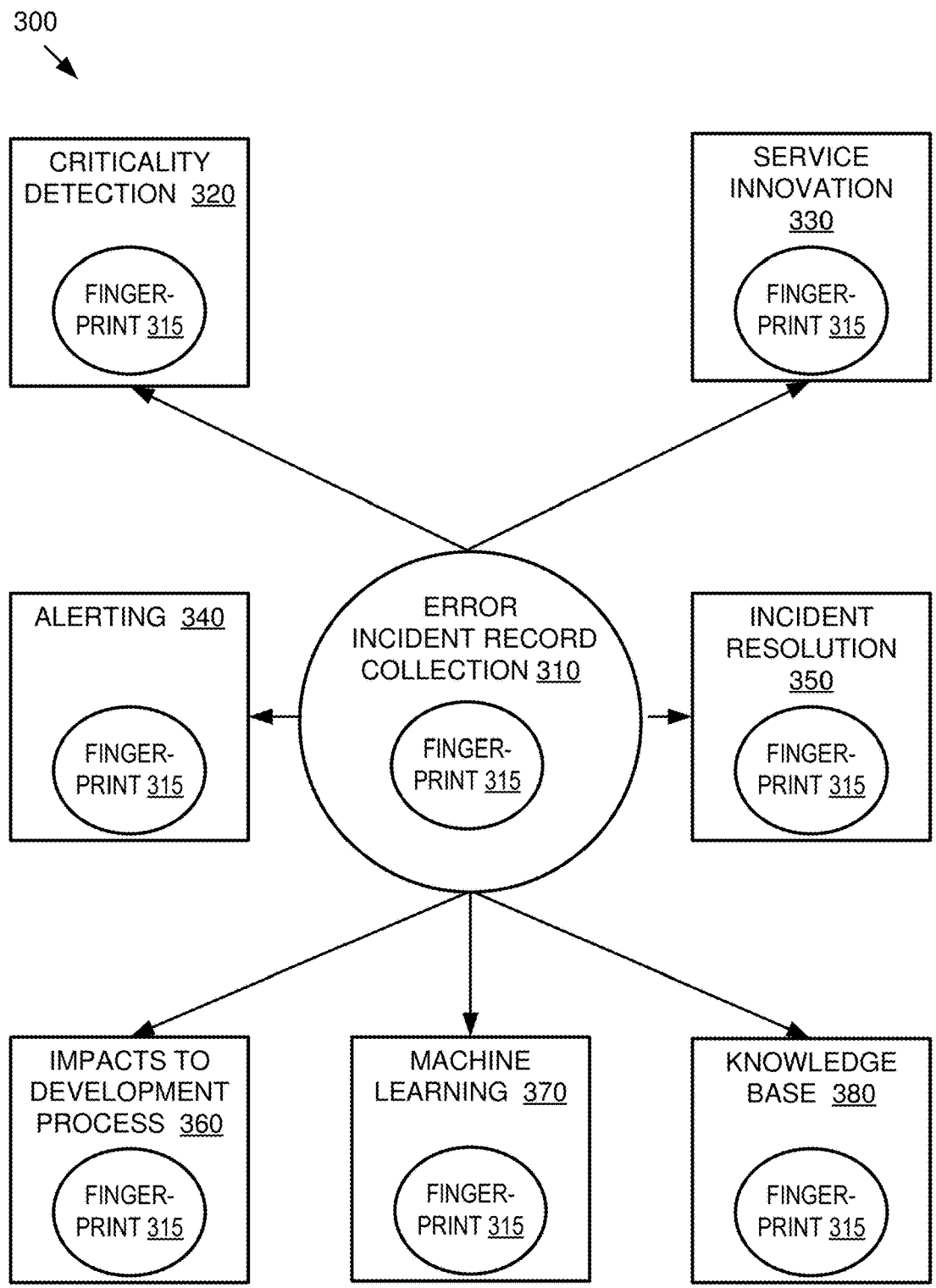
FIG. 3 is a diagram showing multiple use cases for error incident fingerprinting with unique static identifiers.

FIG. 3 is a diagram 300 showing multiple use cases for error incident fingerprinting with unique static identifiers in error incident record collection 310 scenarios. The various use cases share the fact that they employ a n error incident fingerprint 315 as part of their functionality.

The fingerprint 315 can be used for criticality detection 320. For example, after generating an error incident record comprising the fingerprint of the error, the number of other records having the same fingerprint can be counted. The number of records or the number of records during a time period (e.g., the frequency of error occurrence) can be determined and serve as a measurement of criticality of the error.

Errors can then be ranked for prioritization or an alert can be raised if the frequency exceeds a threshold.

The fingerprint 315 can also be applied for service innovation 330. For example, the first time a particular fingerprint appears can open a record for tracking. When the error is resolved, the time to resolution can be measured and used as a metric for resolution effectiveness in the face of various innovation initiatives.

The fingerprint 315 can also be applied in alerting 340 scenarios. For example, the occurrence of errors can be logged, with the fingerprint 315 being present in a log entry. Log analysis software can then proceed to determine when and if an alert is sent to specified user identifiers according to specified criteria. Alerting can be performed whether or not a trouble ticket is generated.

The fingerprint 315 can also be applied in incident resolution 350 scenarios. For example, similar error incident records can be correlated to help determine an overall picture of the error and what its cause or causes are. Similarly, if the error has been resolved, the resolution can be displayed or sent to the user identifier that encountered the error (e.g., the user identifier that submitted an error incident report).

The fingerprint 315 can also be applied to impact the development process 360. For example, developers can correlate error incident records by fingerprint and determine whether a particular development strategy is prone to errors. Developers can also uncover unknown software defects or troublesome code, processes, tasks, or libraries.

The fingerprint 315 can also be applied to machine learning 370 scenarios. For example, the fingerprint can be included as a feature to train a neural network or other artificial intelligence model. Other features can then be predicted based on the model.

The fingerprint 315 can also be used for knowledge base 380 scenarios. For example, the fingerprint can be used as an index, keyword, or tag associated with knowledge base resources as described herein. Search functionality can thus be greatly simplified, reducing search time.

Application of the fingerprinting technology can have a significant impact on the support process. For example, without the fingerprint, it may take weeks of manually evaluating error incident records to determine that various error incident records are even related to each other. Having identified that the records are related can then trigger prioritization of error resolution, which may then be hampered by a lack of a complete picture of under what circumstances the error is occurring.

By contrast, use of the fingerprint technology can provide a clear, accurate picture of the frequency of the error as well as the circumstances under which it is occurring.

Alerting that could never even otherwise take place without such fingerprint technology can be performed as described herein.

Example 5

Example Execution Error

In any of the examples herein, an execution error can take the form of any unwanted, aberrant, or defective behavior during execution of an application. In practice, such errors can be detected by identifying abnormal conditions (e.g., as set forth in an assert statement by a programmer, failure to return a valid value, divide by zero, accessing a null pointer, out of bounds memory access, violation of access control or other security, or the like) and may occur at various levels of the execution environment.

For example, although the error is sometimes called an "application error," the abnormal condition may be detected in software that is outside of the application. For example, a driver or operating system may detect the error. However, the error can still be designated as occurring within a location of the application (e.g., a location within the application that invoked whatever software encountered the error).

Upon encountering an error, execution can be diverted to an error handler. For example, a debugger or other error handling tool can be employed. Execution of the application halts or is suspended.

Errors can be detected in a variety of ways, such as by detecting that an exception has been thrown. Such an exception can be caught by an exception handler, which then directs execution to executable software that handles the error (e.g., an error handling tool). Or, a software interrupt can also be triggered, diverting prosecution to an interrupt routine that invokes the error handler.

Example 6

Example Error Context

In any of the examples herein, error context can comprise details about the error and circumstances under which the error occurred. Upon encountering the error, an error handler can inspect and extract information from the execution context (e.g., machine state) that serves as error context. Such error context can include a static identifier for an application component in which the error occurred. For example, the error processing software can collect error context by inspecting the contents of a stack (e.g., that stores calls of the application an identifiers of application component making the calls), scraping values from a user interface, or the like.

Example 7

Example Static Identifiers

In any of the examples herein, a static identifier can take the form of a value that does not change during execution of the application (e.g., from beginning to end in a typical application execution). For example, an identifier of an application component definition (e.g., module definition identifier, executable process definition identifier, executable task definition identifier, instruction label, or the like), label of a location of or within an application component, or the like can be a static identifier because it does not change during execution.

Such static identifiers can be described from the perspective of development (e.g., an "executable task definition identifier"). However, for sake of convenience, they are sometimes simply called an identifier of the component (e.g., an "executable task identifier").

Such static identifiers are not computed at the time of the error, and are not representative of a current state of execution. Instead, they are constant and remain the same before execution and after execution.

Examples of static identifiers include those indicating a location within an application (e.g., the identifier of an application component definition as described herein).

Examples of non-static identifiers are parameter values that change during execution of the application, memory usage, stack depth, CPU utilization, and the like.

Some information can be static or non-static depending on how it is used. For example, an IP address can be static in the case of a server IP address that remains constant during execution of the application program.

As described herein, such static identifiers can be unique (e.g., within a particular scope) and can be generated at development time in an integrated development environment.

By incorporating harvested definition identifiers that originated from development environment into an error incident fingerprint, the technologies can leverage the distinctness of such a fingerprint to allow differentiation among errors without having to rely on a human description of the error. As a result, errors having the same technical cause can be more easily linked, tagged, manipulated, or indexed as described herein.

Example 8

Example Semi-Static Information

In any of the examples herein, a static identifier can include semi-static information such as database products or version that may differ among different customer and network locations which can be different when multiple data centers are run. For example, consider the following example support tag:
Dynamic Troubleshooting Info
SystemIdentifier: SID
HostFQDN: myhost.city.department.suffix
DBHostFQDN: myhostdb.city.department.suffix
DBMachine=VIRTUAL
DB_KIND=0815
INSTANCE=066
NETWORK_Location=DataCenter10_Segment15
OS=LINUX
OS_Version: 5.00.01-060default
SYSTEM_ROLE=Customer_PRODUCTIVE
Build_Version_1.52
xxxxxxxxx START Support Tag—Copy this line too xxxxxxxxx
RootP: PROD: Build FROM SCRATCH SYSTEM SETUP P:DEV3052 DEV3052
SubP: PROD: Build FROM SCRATCH SYSTEM SETUP P:DEV3052 DEV3052
Task: PROD: SETUP Network LOCATION ID T:DEV6346 DEV6346
SpecificID: PST:DEV10757 DEV10757
logTaskError: Additional status: TASK NOT REQUIRED, see details in manual
xxxxxxxxx END Support Tag—Copy this line too xxxxxxxxx In the above data, the error information can be segregated from location and customer-dependent markers. Items can be taken from the configuration database without human interaction. Semi-static data can be limited by location or a certain version of the process or software level at the time. In this way, the support tag can include data that does not change over a significant period of time. The above Troubleshooting Info offers short term stability, which is good enough for temporary error tracking.

Thus, semi-static information such as database product name in which the error occurred, database product version of the software in which the error occurred, network location where the error occurred, or the like can be used as a static identifier as described herein.

Example 9

Example Fingerprints

In any of the examples herein, an error incident fingerprint can be generated from a unique static identifier extracted from execution context at the time of the error as described herein. For sake of convenience, such a fingerprint is sometimes called simply a "fingerprint" herein. Another way of describing the error incident fingerprint is a "unique-static-identifier-derived fingerprint" because it is based at least in part on a unique static identifier as described herein.

As described herein, such a fingerprint can be very helpful to solve a variety of software support and development challenges.

As described herein, an error incident fingerprint can be used as a key, index, or tag in a knowledge base for a variety of support functions as described herein.

In practice, the fingerprint can take the form of an alphanumeric string that contains one or more string representations of application component definition identifiers (e.g., unique static identifiers that contain numeric components chosen from number ranges) as described herein.

Human readable forms can be used to facilitate recognition in error incident records or reports.

Because the fingerprint can incorporate an identifier of an application component definition, it can indicate an execution location within the application. The location can be within a component of the application that is identified by the identifier.

The fingerprint can also incorporate a status message (e.g., error message) generated while executing instructions at the execution location within the application. A status may just have status information, but it can be an error message. A support-tag-derived location can be combined with the status message as a key input to knowledge management and incident management. The status message can be incorporated by included text or a code of the status message. For example, dictionary compression can be used to reduce the size. Such compression can maintain the static nature of the message (e.g., the value does not change with the addition of new messages).

Example 10

Example Applications

In any of the examples herein, an application can take the form of a software program that is executable to achieve processing. In practice, applications are made up of logical processes that are directed to achieve results such as registering new users, opening new accounts, and the like.

Such logical processes can be assembled from logical tasks, which are smaller pieces of processing work, such as generating connection data, and the like.

From a software development perspective, logical tasks are smaller pieces of programming work that can be assembled into logical processes.

Example 11

Example Application Components

In any of the examples herein, an application component can take the form of a subunit of software and typically indicates a range or ranges of instructions of the application. Such components can be modules, executable processes, executable tasks, and the like. An application can comprise a plurality of any such components. Such components (e.g., their definitions) can be identified by unique static identifiers as described herein, and such identifiers can be generated at creation time of the component (e.g., when a new executable process is created, a unique static identifier for the executable process is generated).

Example 12

Example Application Component Definition Identifiers

In any of the examples herein, an application component identifier can identify an application component definition. In practice, an alphanumeric, binary, or other designator can be used. In practice, such an identifier is stored as part of an integrated development environment and is used as an internal (e.g., unique) identifier to refer to a particular (e.g., single, unambiguous) application component definition.

As described herein, such identifiers can be unique. For example, component definition identifiers can be unique within the component type (e.g., no two executable task definition identifiers are the same within an application). Or, identifiers can be unique across the application (e.g., no two identifiers for any application component definition are the same within an application). Or, identifiers can be unique across multiple applications (e.g., for a set of applications, no two identifiers are alike). A universally unique identifier system can also be used to avoid identifier collisions.

As described herein, number ranges can be used to form part or all of an identifier. Number ranges can be specified for a particular level of granularity (e.g., at the application level, at the module level, at the task level, etc.). Thus, ranges can be controlled by a different granularity than the components to which the unique identifiers are assigned. Generation of an identifier can sequentially pick the next number in a range (e.g., assigned to components of the component type being generated), or some other technique can be used.

Such identifiers can thus be used as unique static identifiers that identify a location within an application. Error incident fingerprints can thus be generated therefrom.

By "unique," it is not meant that there cannot be two occurrences of the identifier, just that a single identifier uniquely identifies a particular application component definition. There may be multiple instances of an error; therefore, there could be multiple instances of the identifier. In some cases, it may be two different errors that occur at the same location in an application. In such a case, the same identifier can be used, and perhaps other information (e.g., non-static information such as error type) can be used to differentiate the different errors that happen to occur at an identical location within the application.

If desired, the component definition identifier can take a hierarchical format. For example, a combination of sub-identifiers can be used so that one identifier identifies multiple components at different levels in the hierarchy (e.g., a module, a process within the module, and a task within the module).

The application component definition identifier can be created responsive to a command to generate a new application component of the application in an integrated development environment. The identifier can be a unique static identifier that identifies a definition of the new application component.

Example 13

Example Process Definition Identifiers

In any of the examples herein, a process definition identifier can take the form of any identifier that indicates a single process definition within an application. The identifiers can be chosen to be unique (e.g., within a project, application, module, or the like). In practice, number ranges can be defined as part of the integrated development environment, and the next number in the range can be selected. Prefixes (e.g., an alpha-numeric prefix) can be used as desired. An identification of the module can also be included (e.g., as a prefix or otherwise).

Such identifiers often correlate with a particular process name (e.g., "Register User" or the like). If multiple instances of an application are executing, the same process definition identifier can be used to identify the same process within the multiple instances. So, an error occurring in the same process in two different instances of the same process (e.g., as defined) will result in an indication of the same process definition identifier as the location of the error (e.g., the process in which the error occurred).

Example 14

Example Task Definition Identifier

In any of the examples herein, a task definition identifier can take the form of an identifier that uniquely identifies an executable task definition. An executable task definition can define one of a plurality of executable tasks in an executable task collection that form an executable process definition.

The identifiers can be chosen to be unique (e.g., within a project, application, module, task, or the like). In practice, number ranges can be defined as part of the integrated development environment, and the next number in the range can be selected. Prefixes (e.g., an alpha-numeric prefix) can be used as desired.

Such identifiers often correlate with a particular task name (e.g., "Trigger PRODUCT discovery" or the like). If multiple instances of an application are executing, the same task definition identifier can be used to identify the same task within the multiple instances. So, an error occurring in the same task in two different instances of the same task (e.g., as defined) will result in an indication of the same task definition identifier as the location of the error (e.g., the task in which the error occurred).

Example 15

Example Knowledge Base

In any of the examples herein, a knowledge base can contain various resources about an application, a larger system, or the like. Such a knowledge base can be part of a support system that manages content and knowledge about software systems. In practice, access to the knowledge base can be provided by a front end user interface that enables a wide variety of functionality for knowledge base resources such as articles, posts, screen shots, backgrounders, and the like (e.g., browsing, searching, sharing, viewing, editing, and the like). The fingerprint described herein can be used as an index, tag, or keyword for resources in the knowledge base.

For example, documents describing the error condition and associated work arounds, solutions, progress in solving, and the like can contain or be indexed by the fingerprint.

Resources relating to the error can thus be quickly found. And, automated location, display, and transmission of such resources can also be supported.

If desired, a related knowledge base resource (e.g., an article describing how to solve the error or a link or other reference to such article) can be output or sent to a user identifier encountering the error responsive to generation of a fingerprint for the error.

Example 16

Example Error Incident Report Validation

In any of the examples herein, validation of error incident report data can be performed with the error incident fingerprint. In other words, a field for identifying the error can be restricted to those values already present in the integrated development environment data.

Example 17

Example Alerting

In any of the examples herein, upon encountering an error, the error can be logged (e.g., a log entry for the error is added to an error log). The error incident fingerprint can be used as a field in the log entry. The log can be monitored, and alerts can be generated based on log criteria. In such a scenario, 240-260 of FIG. 2 can be performed. Then, the error incident record can be added to the log, and alerting can take place.

Criteria can vary. For example, an alert can be generated upon detection of the first occurrence of the fingerprint (e.g., a new error). Or, an error frequency or threshold can be set. For example, responsive to determining that the log contains n errors with the same fingerprint, an alert can be generated.

The alert can include details of the error, such as the fingerprint, application component names, and the like. Knowledge base resources containing the fingerprint can also be included in the alert. For example, an attachment or link to such resources can be included in the alert. The alert can be sent to a user identifier (e.g., email address, user name, or the like) automatically upon meeting the specified criteria.

Using alerts in conjunction with the fingerprints described herein can result in more meaningful alerts. First, such alerts are based on better-defined technical terminology and data. Such alerts can be developed by software engineers who are familiar with the design of the application. Because the fingerprint can incorporate design-time information, such information can be leveraged by the engineers. Also, alerts tend to work well in conjunction with structured data, and the fingerprint can provide consistent structure data.

As a result, in a large operations environment, many issues can be alerted multiple times by different technology layers. A large number of single occurrences of errors reported in a conventional way can quickly overwhelm support staff because they cannot fathom or even structure the incoming reports in a short time. By using the described technologies, errors can be more effectively clustered and recognized as related. So, the machine-derived fingerprint can act as a common denominator helping the text- and language-driven efforts in the support service industry with a more technical, structured, and consistent (e.g., technology-based) approach.

Example 18

Example System Generating a Unique Static Identifier

Figure 4:
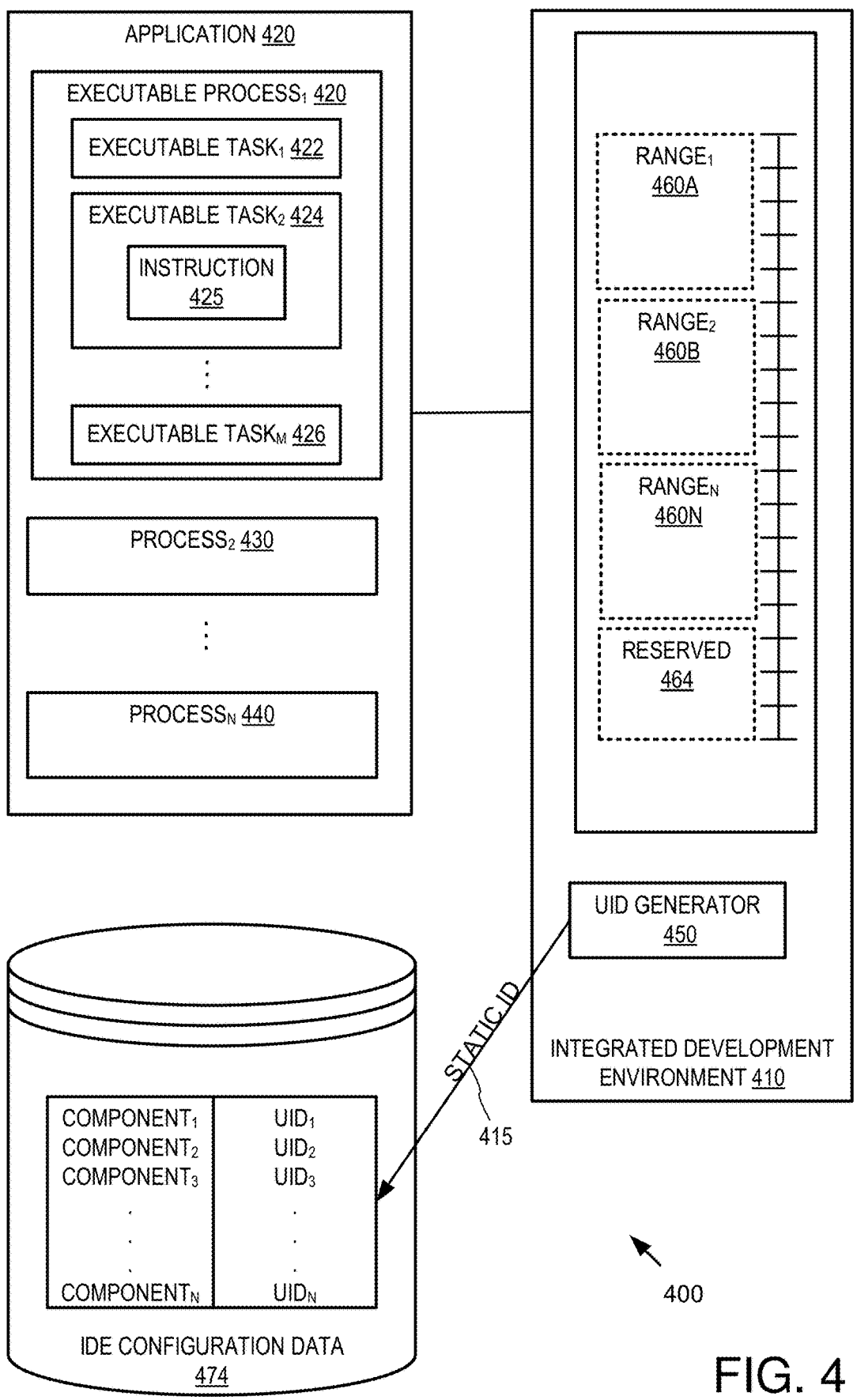
FIG. 4 is a block diagram of an example system implementing unique static identifier generation with an integrated development environment.

FIG. 4 is a block diagram of an example system 400 implementing unique static identifier generation with an integrated development environment 410 and can be used to generate a unique static identifier in any of the examples herein.

In the example, an application 420 comprises a plurality of components (e.g., executable processes 420, 430, 440 having respective one or more tasks (e.g., executable tasks 422, 424, 426). The application components comprise one or more executable instructions 425.

In the example, as part of the integrated development environment, a number ranges functionality within an integrated development environment 410 can be used to specify identifier ranges 460A-460N. Some number ranges may be reserved 464. Such a facility supporting number ranges may already be present in the integrated development environment 410 to allow unique identification of application components, parameter names, and the like, so such identifiers can be leveraged for error incident reporting. A unique identifier generator 450 can generate a static identifier 415. Such static identifiers can be stored in integrated development environment configuration data 474.

Thus, a particular application component is related to a particular unique identifier as shown (e.g., application components and identifiers are mapped to each other).

Although number ranges are typically used, in practice, the identifier can include non-numerical information, such as a textual or abbreviation prefix or suffix.

Example 19

Example Method of Generating a Unique Static Identifier

Figure 5:
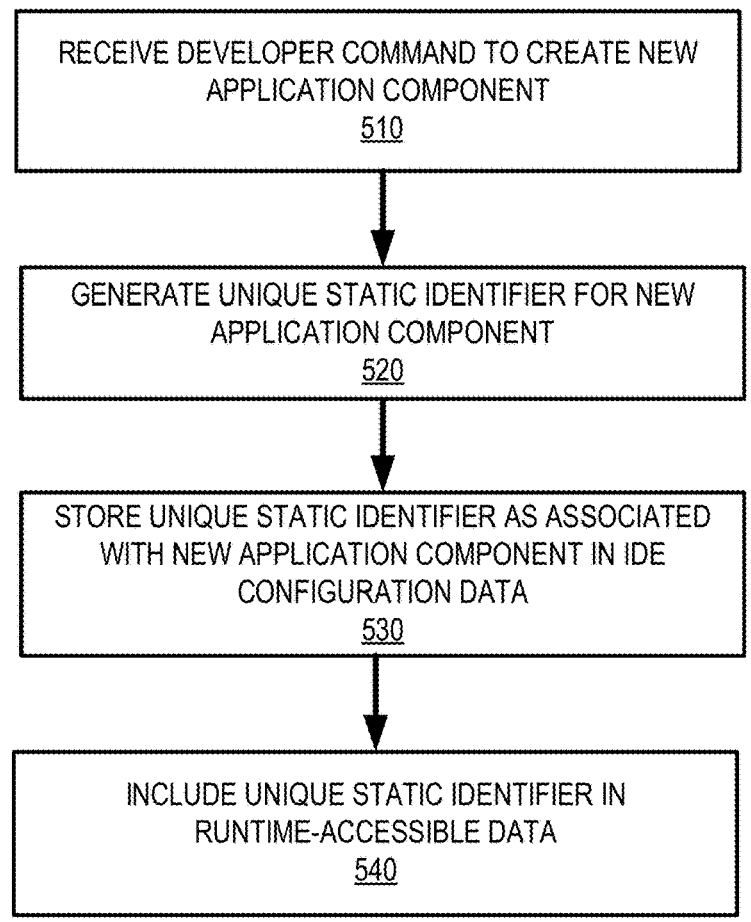
FIG. 5 is a flowchart of an example method of generating a unique static identifier of an application component.

FIG. 5 is a flowchart of an example method 500 of generating a unique static identifier of an application component. The method 500 can be implemented, for example, by a system such as that shown in FIG. 1 or FIG. 4.

At 510, a developer command is received to create a new application component. For example, a new module, executable process, executable task, or the like is created.

For human readability, such a component is typically named using an alpha-numeric identifier for display to the developer. And, at 520, a unique static identifier (e.g., separate from the name and for internal purposes) is generated responsive to the command to create the new application component. As described herein, number ranges can be used. As described herein, generating the unique static identifier can comprise selecting a unique identifier from within a specified number range out of a plurality of configured number ranges for the application in an integrated development environment.

In a retrofitting situation, it is possible to re-open development of an application even if no changes to the logic are being made. In such a case, the identifier can be chosen without having to create the component anew. New identifiers can be chosen to comport with the format for unique static identifiers.

At 530, the unique static identifier is stored as associated with the newly created application component in the integrated development environment configuration data. For example, the identifier is mapped to the component, and the component is mapped to the identifier (e.g., there is a 1:1 mapping). Thus, given an identifier, it is possible to determine the related application component. Depending on scope, mapping may also take the component type as input (e.g., given an identifier and that it identifies an executable task, the particular task associated with the identifier can be identified uniquely).

At 540, the unique static identifier is included in runtime-accessible data of the application (e.g., the identifier can be bundled with the application). Further, when the application component is invoked or called, its identifier can be pushed onto the call stack or otherwise recorded. As a result, when an error occurs, some indication of the identifier can be found in the execution environment as described herein.

Example 20

Figure 6:
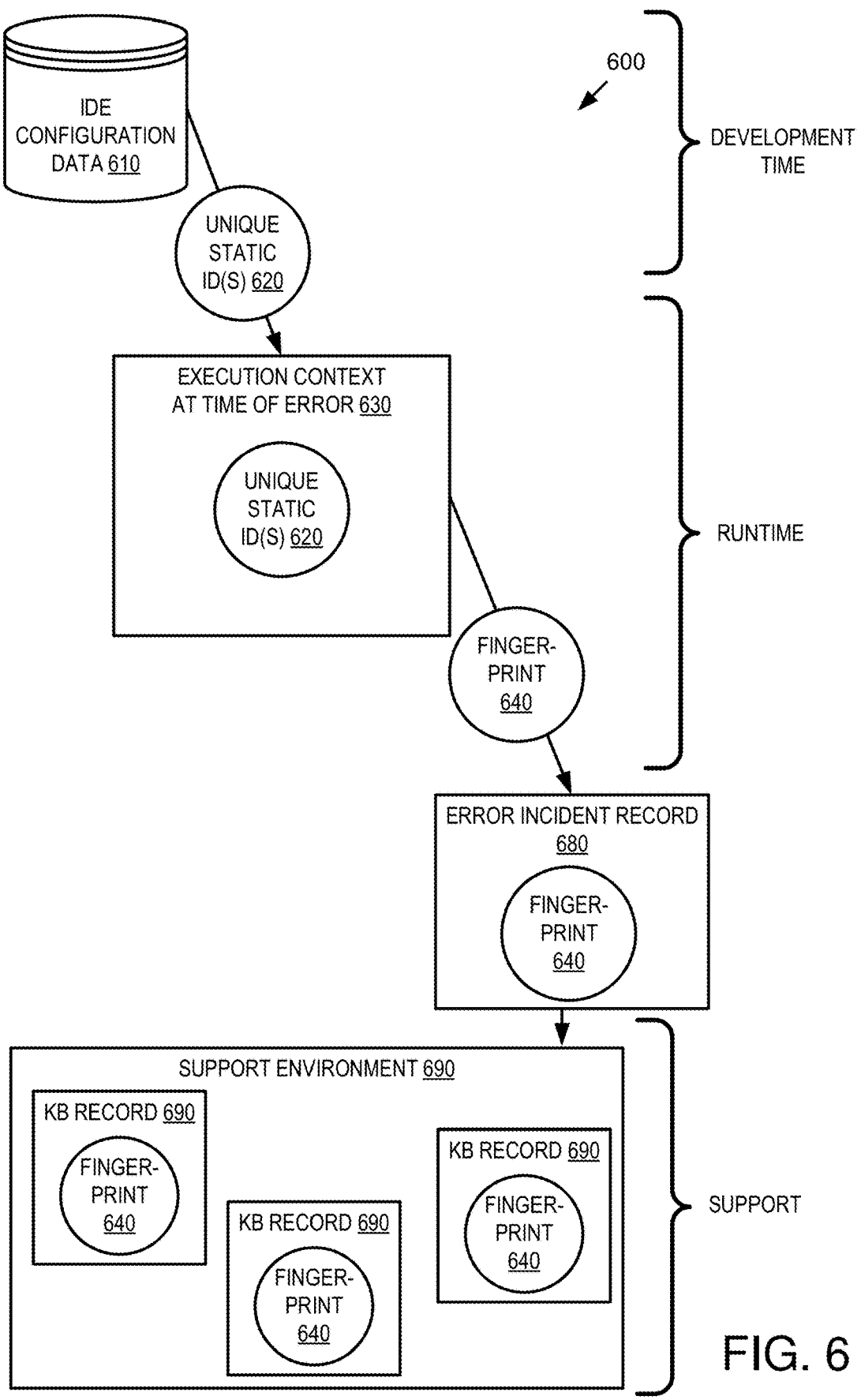
FIG. 6 is a block diagram of an example system applying error incident fingerprinting across the development, runtime, and support phases of the application lifecycle.

Example System Applying Error Incident Fingerprint Across Phases of Application Lifecycle FIG. 6 is a block diagram of an example system 600 applying error incident fingerprinting across the development, runtime, and support phases of the application lifecycle. Used in such a way, the error incident fingerprinting technology provides an innovation that multiplies synergies between software development and software support. In conventional systems, phases of the lifecycle are typically isolated islands or silos that do not share unique identifiers as shown.

In the example, one or more unique static identifiers 620 are generated at development time as part of IDE configuration data 610. The identifier(s) 620 indicates a location (e.g., range of instructions) within the application and is therefore sometimes called "static."

At runtime, the one or more unique static identifiers 620 are harvested from execution context 630 at the time of the error (e.g., sometimes called "error context"). A fingerprint 640 is generated based on the one or more identifiers 620. For example, the fingerprint 640 can be a single identifier, a combination of multiple identifiers, or the like.

An error incident record 680 generated to document the error can include the fingerprint 640. Support functions than thus leverage the static identifier 620 that was created at development time.

Subsequently, in the support phase, various knowledge base records 690 can include the fingerprint 640 in a support environment 690. A wide variety of support functionality can be performed that incorporates the fingerprint 640.

Example 21

Figure 7:
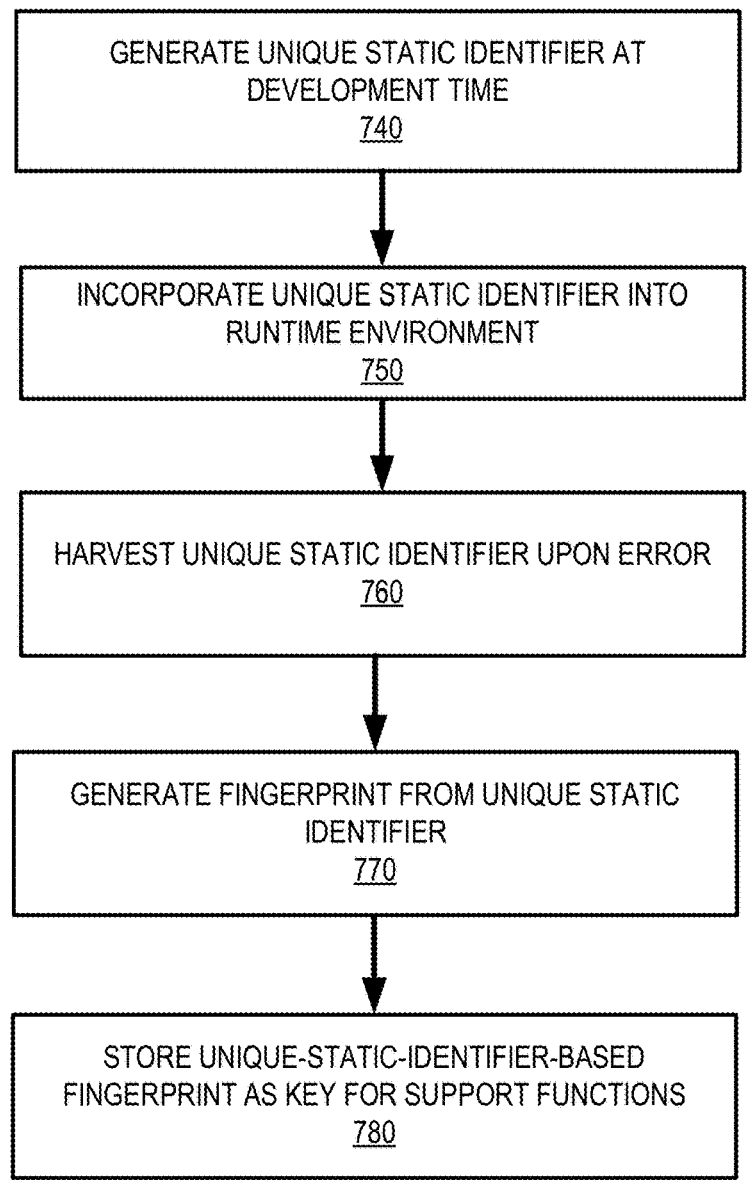
FIG. 7 is a flowchart of an example method of applying error incident fingerprinting across the development, runtime, and support phases of the application lifecycle.

Example Method Applying Error Incident Fingerprint Across Phases of Application Lifecycle FIG. 7 is a flowchart of an example method 700 of applying error incident fingerprinting across the development, runtime, and support phases of the application lifecycle and can be implemented, for example, by the system of FIG. 6.

At 740, a unique static identifier is generated at development time of an application as described herein.

At 750, the unique static identifier is incorporated into the runtime environment in which the application is executing.

At 760, the unique static identifier is harvested upon encountering an error.

At 770, an error incident fingerprint is generated based on the unique static identifier.

At 780, the unique-static-identifier-based fingerprint is stored as an index, keyword, or tag for support functions.

Example 22

Example System Generating an Error Incident Fingerprint

Figure 8:
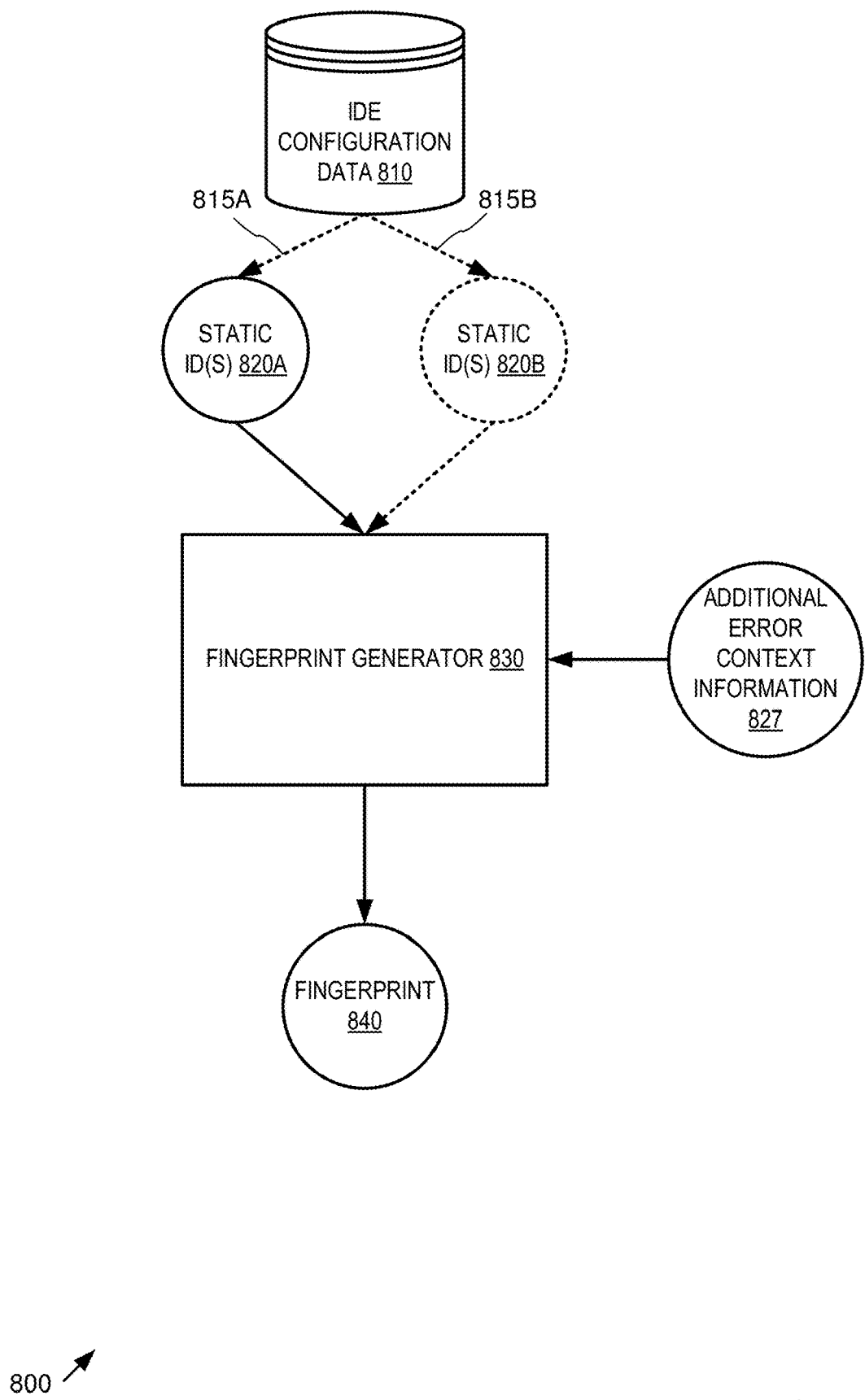
FIG. 8 is a block diagram of an example system generating an error incident fingerprint.

FIG. 8 is a block diagram of an example system 800 generating an error incident fingerprint 840 and can be used to generate an error incident fingerprint in any of the examples herein.

In the example, the fingerprint generator 830 takes one or more static unique identifiers 820A/B as input and outputs an error incident fingerprint 840. As shown herein, the static identifier(s) 820A/B can be harvested from error context at the time of an error for an application.

The static identifier(s) 820A/B can be bundled 815A/B with runtime-accessible information and find their origins in IDE configuration data 810 as described herein.

As shown, additional error context information 827 can be included. Such information can be static information as described herein (e.g., an IP address or the like). Non-static information can also be included, either in the fingerprint 840 itself or a related error incident record.

For cases in which more than one identifier is used as input, the resulting fingerprint 840 can be generated by a table (e.g., an n-dimensional Cartesian coordinate indicates an entry in the table that is used as the fingerprint). Values in the table can be chosen to be unique to avoid collisions.

Another way to combine more than one identifier is to simply concatenate the identifiers together (e.g., as a text string representing the numbers and any other information, including human-readable labels or abbreviations).

An intermediate step (not shown) can add a prefix, suffix, or abbreviation to the one or more identifiers. So, for example, if the static identifier is a number ("5412") that represents an executable process, a text string such as ("PROC:5412") can be generated and included in or used as the fingerprint 840. For multiple identifiers, different prefixes, suffixes, or abbreviations can be used (e.g., "PROC:5412 TASK:3342"). Additional information can be included before, between or after such a combination of multiple identifiers.

In practice, the fingerprint 840 can simply take the value of the static identifier 820A. A prefix, suffix, or abbreviation can be added.

The error incident fingerprint 840 can be generated so as to be reversible. In other words, the identifier can be extracted from the fingerprint 840, and a relevant component within the application can be identified. For example, if the fingerprint 840 includes the text string ("PROC:5412"), it can be determined that a particular executable process is indicated (e.g., in the IDE configuration data 810 or a copy of the relevant identifying data thereof). A human readable name can be determined from the configuration data 810 (e.g., "Change username" or the like).

In cases where the fingerprint 840 is a combination of identifiers, it is sometimes called a "combo identifier."

Example 23

Example Method of Generating an Error Incident Fingerprint

Figure 9:
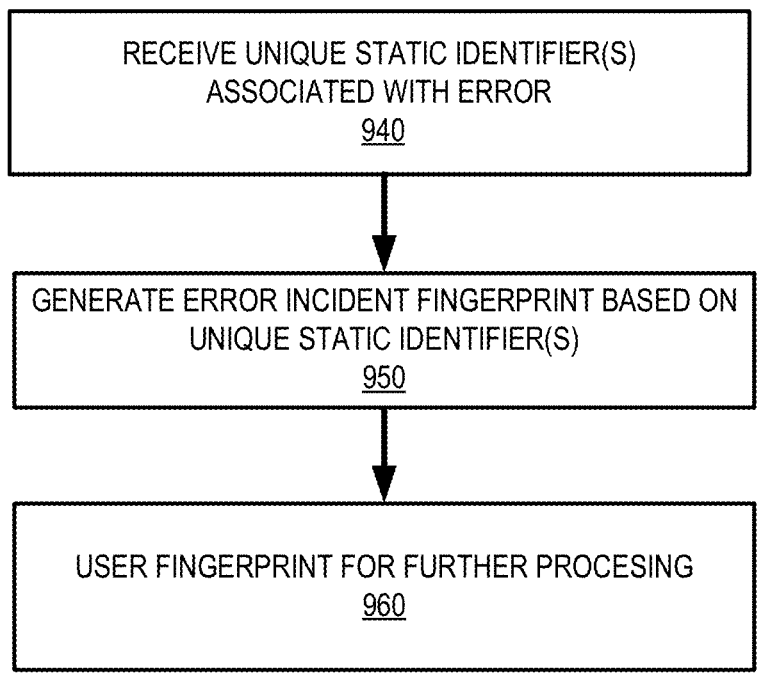
FIG. 9 is a flowchart of an example method of generating an error incident fingerprint.

FIG. 9 is a block diagram of an example method 900 of generating an error incident fingerprint that can be used in any of the examples and can be performed, for example, by the system of FIG. 8.

At 940, one or more unique static identifiers associated with an error are received. As described herein, such identifier(s) can be harvested from run-time information at time of an application error, thus serving as error context information.

At 950, an error incident fingerprint is generated based on the one or more unique static identifiers. As described herein, such generation can range from simply using a single identifier as the fingerprint to combining fingerprints. Additional information can also be included (e.g., human-readable labels as described herein).

At 960, the fingerprint is then used for further processing. A wide variety of functionality can be supported as described herein, including searching knowledge base resources and the like.

Example 24

Figure 10:
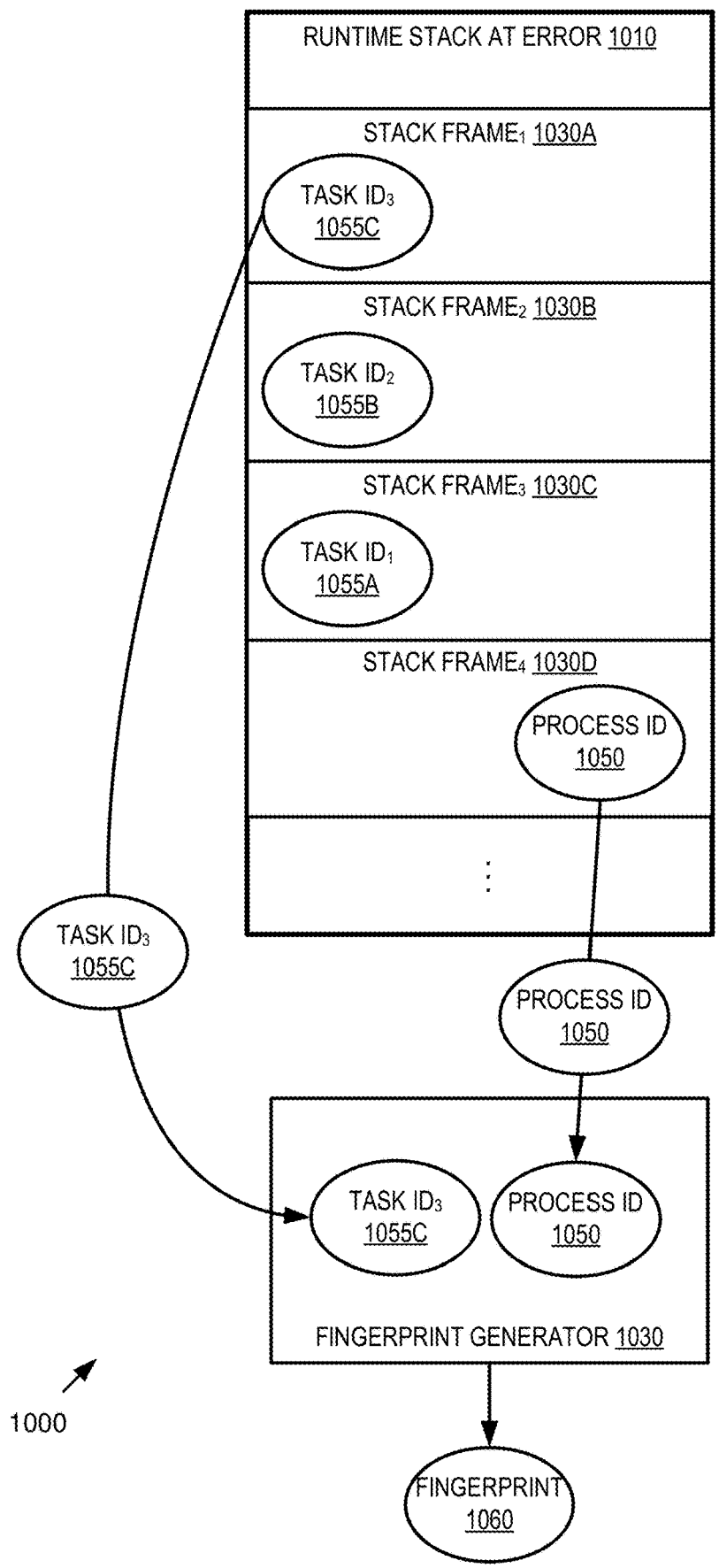
FIG. 10 is a block diagram of an example system generating an error incident fingerprint from a runtime environment.

Example System Generating an Error Incident Fingerprint From a Runtime Environment FIG. 10 is an example system 1000 generating an error incident fingerprint 1060 from a runtime environment and can be used in any of the examples herein to generate a fingerprint.

In the example, an application encounters an error at runtime, and the runtime stack 1010 at the time the error occurs is shown. The stack 1010 comprises a plurality of stack frames 1030A-D. The most recent executable task identifier 1055C out of the recorded task identifiers 1055A-C and the most recent executable process identifier 1050 out of the recorded task identifiers are harvested from the runtime environment and used as input to the fingerprint generator 1030. Fingerprint generation can then proceed as described herein.

During execution (e.g., before the error), the identifiers are pushed onto the stack as part of the stack frame when the application component is started (e.g., called).

In practice, other unique static identifiers can be used in place or in addition to executable task identifiers and executable process identifiers.

Example 25

Figure 11:
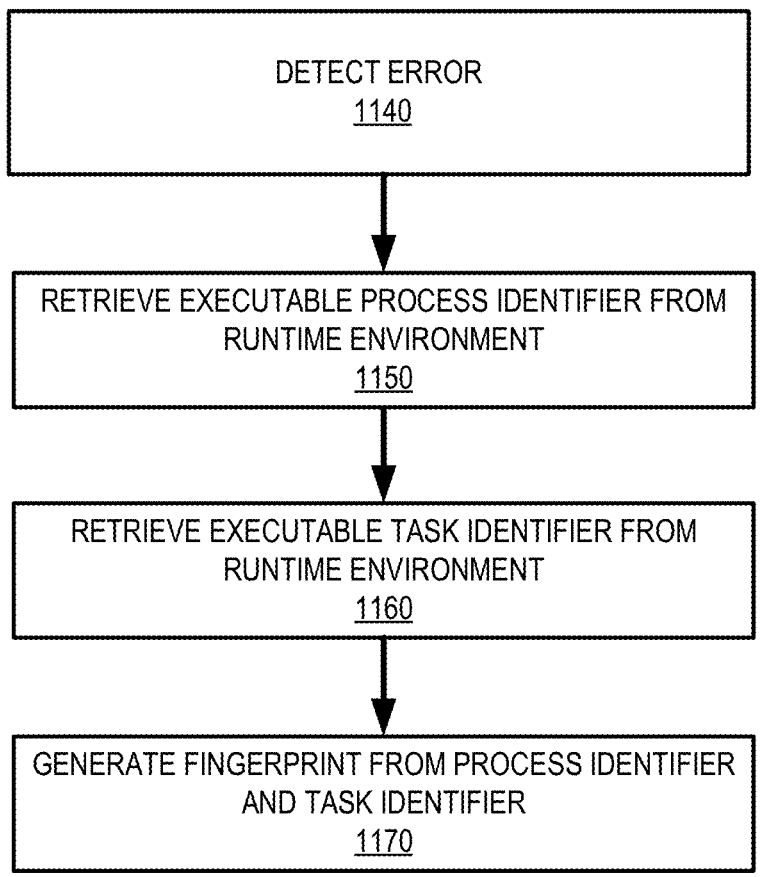
FIG. 11 is a flowchart of an example method of generating an error incident fingerprint from a runtime environment.

Example Method of Generating an Error Incident Fingerprint From a Runtime Environment In any of the examples herein, collecting the error context of an error can comprise collecting a unique static identifier from a stack storing calls of the application. FIG. 11 is a flowchart of an example method 1100 that can be used in any of the examples herein to generate an error incident fingerprint from a runtime environment and can be implemented, for example, by the system of FIG. 10.

At 1140, an error is detected while running the application. For example, an exception handler, software interrupt, error reporter, or other mechanism can be invoked when conditions indicate that abnormal execution has taken place. As described herein, such errors can originate from a variety of circumstances. The invoked mechanism can then harvest a unique static identifier.

At 1150, an executable process identifier is retrieved from the runtime environment. As described herein, the most recent (e.g., last process invoked) process identifier can be used. In any of the examples herein, a first unique static identifier can be harvested, and then a second unique static identifier can be harvested.

At 1160, an executable task identifier from the runtime environment is retrieved from the runtime environment. Again, the most recent task identifier can be used.

The executable task identifier identifies an executable process of the application within which the error occurred, and the executable task identifier identifies an executable task within the executable process within which the error occurred.

At 1170, an error incident fingerprint is generated from the process identifier and the task identifier. Generating such a fingerprint can comprise combining two or more identifiers.

In practice, other unique static identifiers can be used in place or in addition to executable task identifiers and executable process identifiers.

Example 26

Example Scraping System

Figure 12:
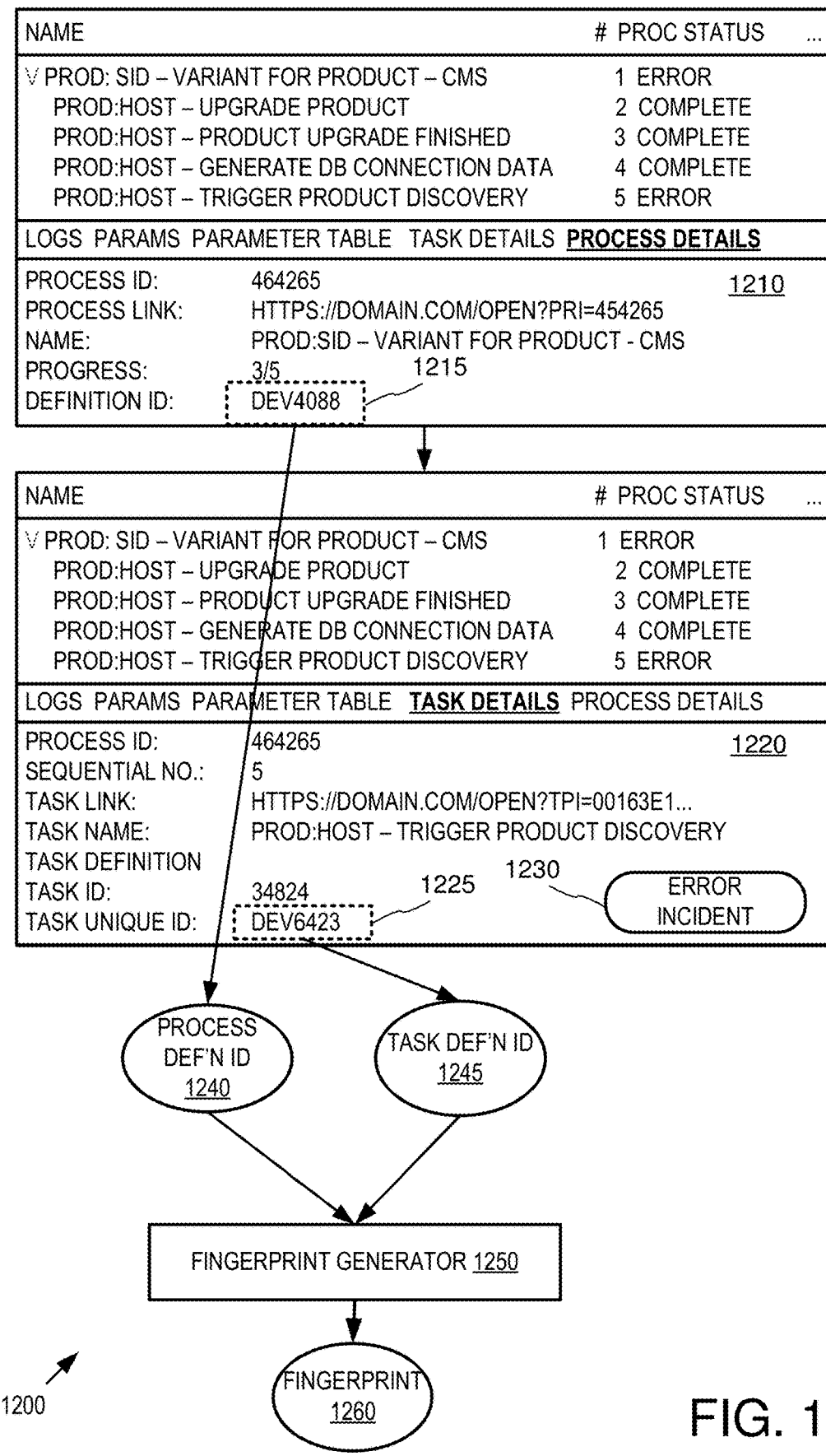
FIG. 12 is a block diagram of an example system scraping unique static identifiers from a user interface for error incident fingerprint generation.

FIG. 12 is a block diagram of an example system 1200 scraping unique static identifiers from a user interface for error incident fingerprint 1260 generation and can be used in any of the examples herein.

In the example, an error reporter is invoked upon encountering an error. Two example screen shots 1210 and 1220 of the error reporter are shown. The first screen shot 1210 displays a definition identifier "DEV4088" 1215 of the process in which the error occurred. Such an identifier 1215 can serve as a unique static identifier (e.g., the process definition identifier) for generating an error incident fingerprint.

The second screen shot 1220 displays a definition identifier "DEV6423" 1225 of the task in which the error occurred. Such an identifier 1225 can serve as a unique static identifier (e.g., the task definition identifier) for generating an error incident fingerprint. A particular screen shot can be displayed when the respective tab is selected (e.g., "task details" or "process details").

The values 1215 and 1225 can be scraped from the user interface. Such scraping can be accomplished by analyzing the displayed values (e.g., analyzing pixels at particular locations of the graphical user interface) or by referring to the values within the internal representation of the user interface (e.g., by copying values from memory that are at particular memory locations known to be associated with the field names).

Acquisition of the values can be performed while supporting language independence. Although the term "scraping" is used, in practice, scraping can acquire values at lower levels of the system than the final displayed user interface. For example, internal, language-independent user interface labels can be retrieved, and the internal technical elements underlying system that generates the user interface can be accessed in a language-independent way. Thus, values can be acquired by tapping into the system before the language layers with the mapping tables overlay the user interface. Language-independent value scraping can thus be supported.

The scraped values 1240 and 1245 can then be used as input to an error incident fingerprint generator 1250 to generate a fingerprint 1260 as described herein.

Scraping can be performed automatically in the background or performed responsive to a user action (e.g., activating the "Error Incident" graphical button 1230).

Example 27

Example Method of Scraping Unique Static Identifiers

Figure 13:
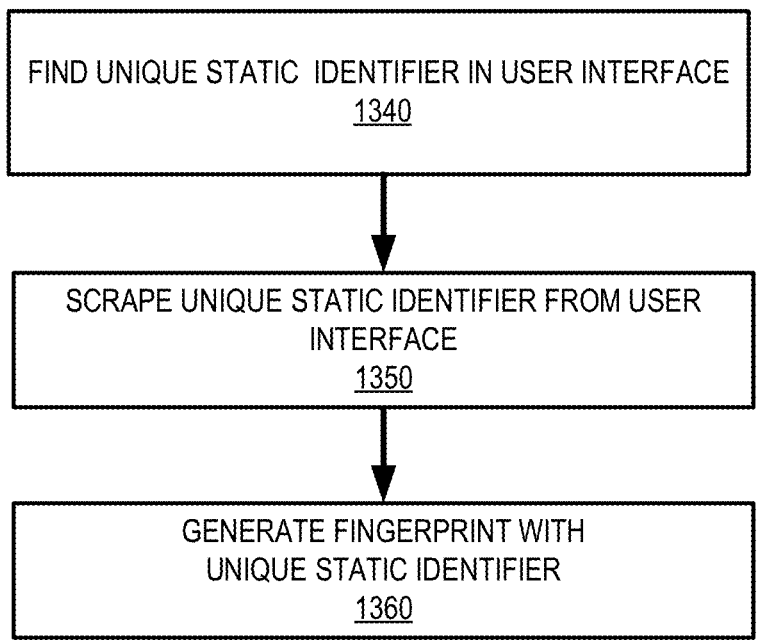
FIG. 13 is a flowchart of an example method of scraping unique static identifiers from a user interface for error incident fingerprint generation.

In any of the examples herein, collecting error context information of an error can comprise scraping a unique static identifier from a user interface of an error reporting tool. FIG. 13 is a flowchart of an example method 1300 of scraping unique static identifiers from a user interface for error incident fingerprint generation and can be used in any of the examples herein to generate a unique static identifier. The method 1300 can be performed, for example, by the system of FIG. 12.

The method 1300 can begin after the error is encountered and a user interface displaying details of the error is displayed (e.g., by an error handling tool).

At 1340, a static unique identifier is located in a user interface displaying details of the error. The location can be a physical location (e.g., a particular region of the graphical user interface) or an internal location (e.g., a user interface element identifier indicates a field name, and the field has the static unique identifier). User interface labels and internal technical elements of the underlying system can be accessed (e.g., before the language layers with mapping tables overlay the user interface).

At 1350, the unique static identifier (e.g., a value rendered by the user interface, or internal information from which such a value is rendered) is scraped from the user interface. In the case of multiple identifiers, 1350 can be repeated.

At 1360, a fingerprint is generated with the one or more unique static identifiers scraped from the user interface.

Example 28

Example Support Tag

In any of the examples herein, an error incident fingerprint support tag can be generated for use in communications, documents, or the like. An example tag is shown in Table 1.

TABLE 1

| Support Tag |
| --- |
| *** START Support Tag - Copy this line too *<br>RootP: PROD: CREATE CUSTOMER NETWORK MAIN P:DEV3408 DEV3408<br>SubP: PROD: SID - VARIANT FOR PRODUCT - CMS P:DEV4088 DEV4088<br>Task: PROD: HOST - Trigger PRODUCT discovery T:DEV6423 DEV6423<br>SpecificID: PST:DEV21143 DEV21443<br>logTaskError: PRODUCTREGISTRATIONStatus:ERROR<br>* END Support Tag - Copy this line too *** |

In any of the examples herein, after an error incident fingerprint is generated, it can be included in the support tag, and the support tag can be stored as accompanying any error incident report record associated with the error.

Example 29

Example Method of Implementation

The following is a more detailed example method of implementing the technologies herein in a knowledge base context. The method can be implemented as one or more computer-readable media having encoded thereon computer-executable instructions causing one or more processors to perform the method.

At development time of an application comprising a plurality of executable processes that comprise a collection of a plurality of executable tasks, unique identifier of a given one of the executable processes can be generated. And, a unique identifier of a given one of the executable tasks can be generated, wherein the given executable task is a member of the collection of the given executable process.

Upon encountering an error during runtime of the application while executing the given executable task of the given executable process, the unique identifier of the executable task and the unique identifier of the executable process can be retrieved from an execution context of the application.

The unique identifier of the given executable task and the unique identifier of the given executable process can be combined into a fingerprint of the error.

Based on the fingerprint of the error, a document in a knowledge base that describes a solution of the error can be located.

The document in the knowledge base that describes the solution of the error can then be output. For example, a message can be sent to a user that includes the document as an attachment or link.

Example 30

Figure 14:
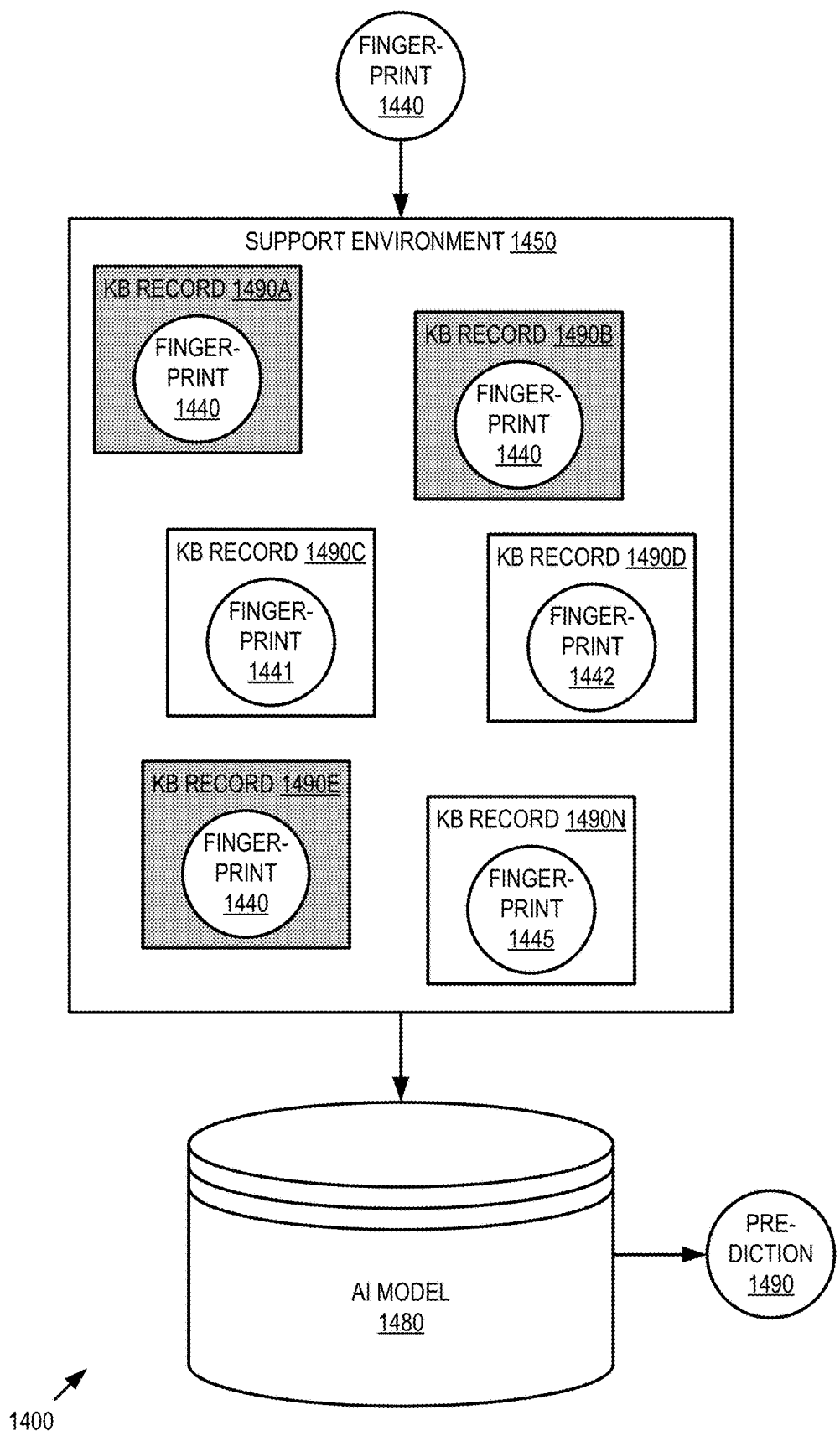
FIG. 14 is a block diagram of an example system filtering knowledge base records based on error incident fingerprint in a machine learning context.

Example System Filtering Knowledge Base Records Based on Error Incident Fingerprint FIG. 14 is a block diagram of an example system 1400 filtering knowledge base records based on error incident fingerprint in a machine learning context that can be used in any of the examples herein.

In the example, a support environment 1450 receives error incident fingerprints 1440, stores them, filters them (e.g., the fingerprints 1440 having the same value are distinguished from those 1441, 1442, 1445 that do not have the value), and then outputs the filtered error incident fingerprints to an artificial intelligence model 1480 for training. A prediction 1490 can then be made.

In practice, the artificial intelligence model 1480 accepts features other than the fingerprint 1440 and can predict them.

The described technologies can solve a number of technical problems in the machine learning context. First, the technologies can provide a foundation for mechanizing the work of support and service departments. Not only the data collection task, but the static identifier-described identification of errors can be automated. In practice, the technologies provide a new error description language to describe position and type of error. Such information can be stored in a known error database that can be leveraged by machine learning. Because the information can be included with a shipped product, the software product itself is enhanced and can perform machine learning because a reliable, mechanical, and structured description of error position and type is derived. Also, error matching to known error databases can be fully automated.

The technologies can provide a low-level error description that remains static and is useful in the machine learning context because the error is consistently described in a way that can lead to mechanical association between error conditions and any number of features.

Example 31

Figure 15:
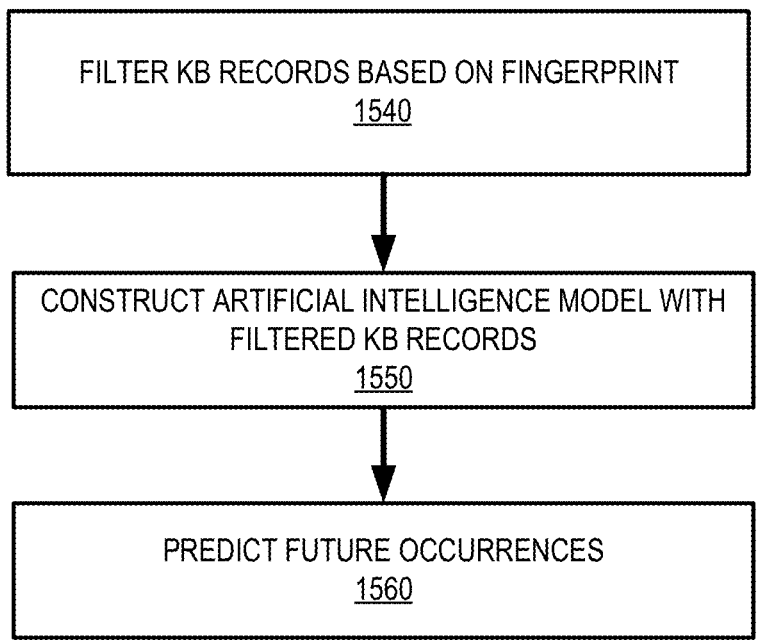
FIG. 15 is a flowchart of an example method of filtering knowledge base records based on error incident fingerprint in a machine learning context.

Example Method of Filtering Knowledge Base Records Based on Error Incident Fingerprint FIG. 15 is a flowchart of an example method 1500 of filtering knowledge base records based on error incident fingerprint in a machine learning context and can be implemented, for example, by the system of FIG. 14.

At 1540, knowledge base records are filtered based on the fingerprint value (e.g., those knowledge base records having the specified fingerprint value are included).

At 1550, an artificial intelligence model is then constructed with the filtered knowledge base records. For example, features other than the fingerprint can be included as input to the model, which is trained to make a prediction of one or more of the features.

At 1560, a future occurrence of the fingerprint can be predicted. For example, it can be predicted that the error will occur across a class of machines or the like.

Validation of prediction can be readily supported because of the consistent, mechanical, and structured description of the error by the fingerprint. Superior machine learning can be supported due to the reliability of validation.

Example 32

Example Computing Systems

Figure 16:
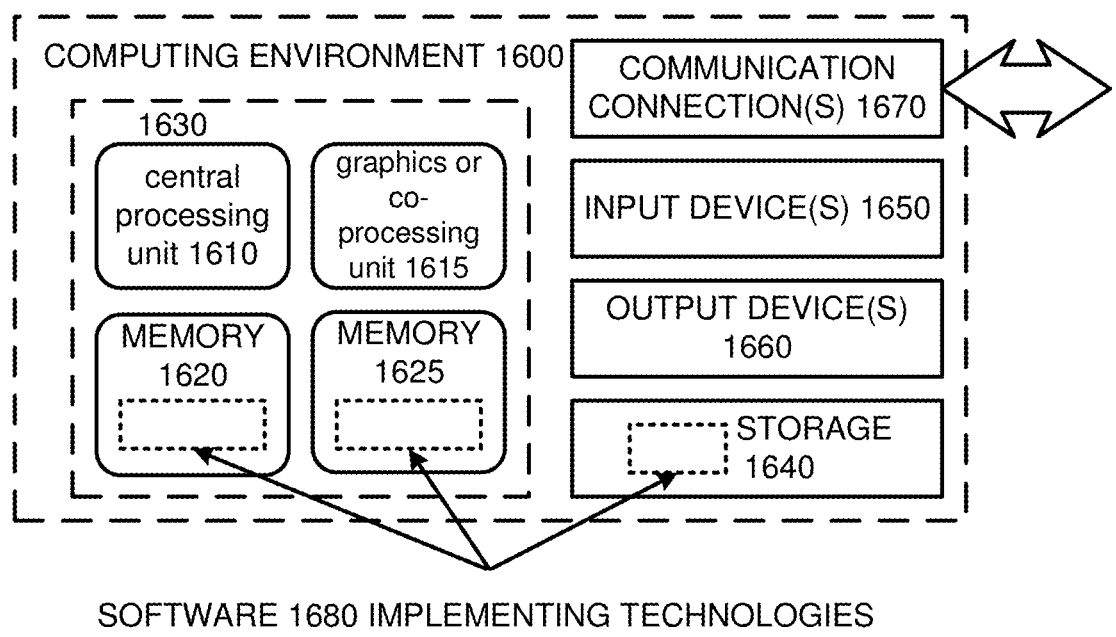
FIG. 16 is a diagram of an example computing system in which described embodiments can be implemented.

FIG. 16 depicts an example of a suitable computing system 1600 in which the described innovations can be implemented. The computing system 1600 is not intended to suggest any limitation as to scope of use or functionality of the present disclosure, as the innovations can be implemented in diverse computing systems.

With reference to FIG. 16, the computing system 1600 includes one or more processing units 1610, 1615 and memory 1620, 1625. In FIG. 16, this basic configuration 1630 is included within a dashed line. The processing units 1610, 1615 execute computer-executable instructions, such as for implementing the features described in the above examples. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 16 shows a central processing unit 1610 as well as a graphics processing unit or co-processing unit 1615. The tangible memory 1620, 1625 can be volatile memory (e.g., registers, cache, RAM), non-volatile memory (e.g., ROM, EEPROM, flash memory, etc.), or some combination of the two, accessible by the processing unit(s) 1610, 1615. The memory 1620, 1625 stores software 1680 implementing one or more innovations described herein, in the form of computer-executable instructions suitable for execution by the processing unit(s) 1610, 1615.

A computing system 1600 can have additional features. For example, the computing system 1600 includes storage 1640, one or more input devices 1650, one or more output devices 1660, and one or more communication connections 1670, including input devices, output devices, and communication connections for interacting with a user. An interconnection mechanism (not shown) such as a bus, controller, or network interconnects the components of the computing system 600. Typically, operating system software (not shown) provides an operating environment for other software executing in the computing system 1600, and coordinates activities of the components of the computing system 1600.

The tangible storage 1640 can be removable or non-removable, and includes magnetic disks, magnetic tapes or cassettes, CD-ROMs, DVDs, or any other medium which can be used to store information in a non-transitory way and which can be accessed within the computing system 1600. The storage 1640 stores instructions for the software 1680 implementing one or more innovations described herein.

The input device(s) 1650 can be an input device such as a keyboard, mouse, pen, or trackball, a voice input device, a scanning device, touch device (e.g., touchpad, display, or the like) or another device that provides input to the computing system 1600. The output device(s) 1660 can be a display, printer, speaker, CD-writer, or another device that provides output from the computing system 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of hardware with software implementing the functionality described herein.

In various examples described herein, a module (e.g., component or engine) can be coded to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 33

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 34

Example Cloud Computing Environment

Figure 17:
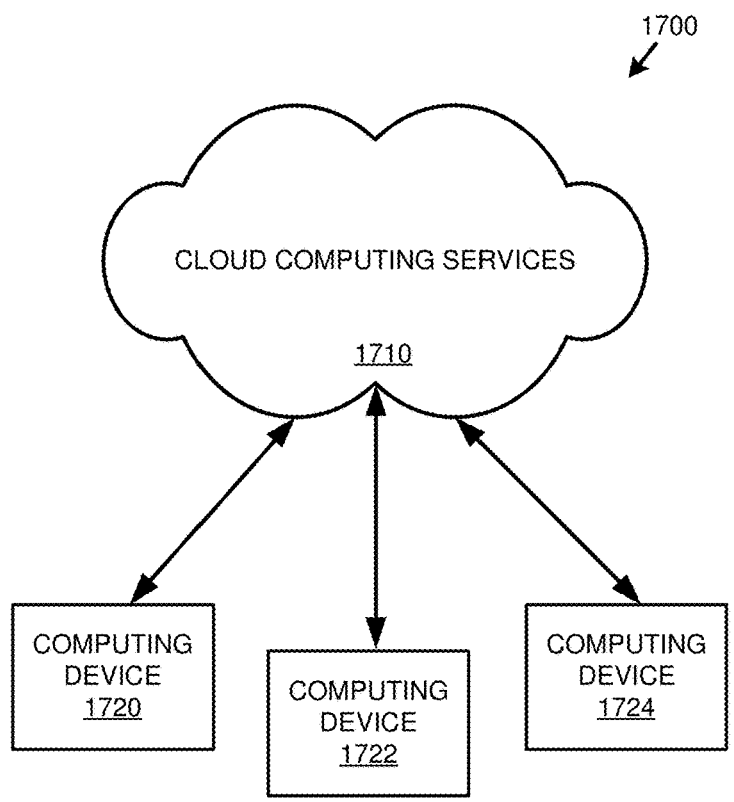
FIG. 17 is a diagram of an example cloud computing environment that can be used in conjunction with the technologies described herein.

FIG. 17 depicts an example cloud computing environment 1700 in which the described technologies can be implemented, including, e.g., the system 100 of FIG. 1 and other systems herein. The cloud computing environment 1700 comprises cloud computing services 1710. The cloud computing services 1710 can comprise various types of cloud computing resources, such as computer servers, data storage repositories, networking resources, etc. The cloud computing services 1710 can be centrally located (e.g., provided by a data center of a business or organization) or distributed (e.g., provided by various computing resources located at different locations, such as different data centers and/or located in different cities or countries).

The cloud computing services 1710 are utilized by various types of computing devices (e.g., client computing devices), such as computing devices 1720, 1722, and 1724. For example, the computing devices (e.g., 1720, 1722, and 1724) can be computers (e.g., desktop or laptop computers), mobile devices (e.g., tablet computers or smart phones), or other types of computing devices. For example, the computing devices (e.g., 1720, 1722, and 1724) can utilize the cloud computing services 1710 to perform computing operations (e.g., data processing, data storage, and the like).

In practice, cloud-based, on-premises-based, or hybrid scenarios can be supported.

Example 35

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 36

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
upon encountering an error during runtime of an application, collecting an error context of the error, wherein the error context comprises a unique static identifier automatically generated at development time of the application responsive to a developer command to create a new application component, and the unique static identifier identifies an application component definition of an application component in which the error occurred;
based at least on the unique static identifier, generating an error incident fingerprint of the error;
generating an error incident record comprising the error incident fingerprint of the error;
finding a match between the generated error incident record and one or more other error incident records based on the error incident fingerprint generated from the unique static identifier; and
storing an association between the generated error incident record and the one or more matching other error incident records.

2. The method of claim 1 further comprising:
responsive to a command to generate a new application component of the application in an integrated development environment, generating the unique static identifier, wherein the unique static identifier identifies a definition of the new application component.

3. The method of claim 1 wherein:
the fingerprint of the error indicates an execution location within the application.

4. The method of claim 3 wherein:
the execution location is within a component of the application; and
the unique static identifier identifies the component of the application.

5. The method of claim 3 wherein:
the fingerprint of the error comprises a status message generated while executing instructions at the execution location within the application.

6. The method of claim 1 wherein:
the error occurs within a component location; and
the method further comprises:
at development time of the application, generating the unique static identifier in response to a request to create a component of the application, wherein the component location is within the component of the application.

7. The method of claim 6 wherein:
generating the unique static identifier comprises selecting a unique identifier from within a specified number range out of a plurality of configured number ranges for the application in an integrated development environment.

8. The method of claim 6 further comprising:
including the unique static identifier in runtime-accessible data of the application.

9. The method of claim 1 further comprising:
locating a knowledge base document via the fingerprint, wherein the knowledge base document describes a solution to the error.

10. The method of claim 9 further comprising:
sending the knowledge base document to a user identifier stored as associated with the error incident record.

11. The method of claim 1 wherein:
collecting the error context of the error comprises scraping the unique static identifier from a user interface of an error reporting tool.

12. The method of claim 1 wherein:
collecting the error context of the error comprises collecting the unique static identifier from a stack storing calls of the application.

13. The method of claim 1 wherein:
collecting the error context of the error is performed by an exception handler that harvests the unique static identifier.

14. The method of claim 1 wherein:
the unique static identifier comprises a first unique static identifier; and
generating the fingerprint comprises combining the first unique static identifier with a second unique static identifier.

15. The method of claim 14 wherein:
the first unique static identifier comprises a process identifier identifying an executable process of the application within which the error occurred; and
the second unique static identifier comprises a task identifier identifying an executable task within the executable process within which the error occurred.

16. The method of claim 1 wherein:
collecting the error context of the error comprises collecting a process identifier and a task identifier.

17. The method of claim 1 further comprising:
training a machine learning model with a plurality of incident records having the fingerprint.

18. A system comprising:
one or more processors;
memory coupled to the one or more processors comprising instructions causing the one or more processors to perform the following when executed:
upon encountering an error during runtime of an application, collecting contextual information of the error, wherein the error contextual information comprises a unique static identifier generated at development time of the application, and the unique static identifier identifies a component location in which the error occurred, the component location comprising a given executable process and a given executable task;
wherein the unique static identifier comprises:
a first unique identifier of the given executable process out of a plurality of executable processes and;
a second unique identifier of the given executable task out of a plurality of executable tasks, wherein the first and second unique identifiers are scraped from an error report of a user interface;
based at least on the unique static identifier, generating a fingerprint of the error;
generating an error incident record comprising the fingerprint of the error; and
generating an alert based on the error incident record.

19. The system of claim 18 further comprising:
logging the error in a log;
wherein generating an alert is performed responsive to detecting a threshold number of occurrences of errors in the log having the fingerprint.

20. One or more computer-readable media having encoded thereon computer-executable instructions causing one or more processors to perform a method comprising:
at development time of an application comprising a plurality of executable processes that comprise a collection of a plurality of executable tasks, generating a unique identifier of a given executable process out of the executable processes and generating a unique identifier of a given executable task out of the executable tasks, wherein the given executable task is a member of the collection of the given executable process;
upon encountering an error during runtime of the application while executing the given executable task of the given executable process, retrieving the unique identifier of the given executable task and the unique identifier of the given executable process from an execution context of the application;
combining the unique identifier of the given executable task and the unique identifier of the given executable process into a fingerprint of the error;
based on the fingerprint of the error, locating a document in a knowledge base that describes a solution of the error; and
outputting the document in the knowledge base that describes the solution of the error.

* * * * *